United States Patent
Mendoza et al.

(10) Patent No.: US 11,126,933 B2
(45) Date of Patent: Sep. 21, 2021

(54) RESERVATION PROCESSING

(71) Applicant: NCR Corporation, Duluth, GA (US)

(72) Inventors: Joseph Jover Piñon Mendoza, Mandaue (PH); Robyn Cortes Zambo, Mandaue (PH); Ferdinand Salarda Acedera, Cebu (PH)

(73) Assignee: NCR Corporation, Atlanta, GA (US)

( * ) Notice: Subject to any disclaimer, the term of this patent is extended or adjusted under 35 U.S.C. 154(b) by 1294 days.

(21) Appl. No.: 14/697,818

(22) Filed: Apr. 28, 2015

(65) Prior Publication Data

US 2016/0321565 A1   Nov. 3, 2016

(51) Int. Cl.
*G06Q 10/02* (2012.01)
*G06Q 50/12* (2012.01)

(52) U.S. Cl.
CPC ............ *G06Q 10/02* (2013.01); *G06Q 50/12* (2013.01)

(58) Field of Classification Search
CPC ............................... G06Q 10/02; G06Q 50/12
See application file for complete search history.

(56) References Cited

U.S. PATENT DOCUMENTS

| | | | | |
|---|---|---|---|---|
| 8,143,811 B2 * | 3/2012 | Shloush | ............ | H05B 37/0218 315/297 |
| 8,670,873 B2 * | 3/2014 | Shloush | ............ | H05B 37/0218 307/39 |
| 10,032,144 B1 * | 7/2018 | Jacob | ................... | G06Q 20/102 |
| 2002/0052790 A1 * | 5/2002 | Tomishima | ............ | G06Q 10/02 705/15 |
| 2010/0262296 A1 * | 10/2010 | Davis | ..................... | G05B 15/02 700/275 |
| 2010/0262297 A1 * | 10/2010 | Shloush | ............ | H05B 37/0218 700/276 |
| 2011/0010019 A1 * | 1/2011 | Shloush | ............ | H05B 37/0218 700/295 |
| 2011/0185391 A1 * | 7/2011 | Peterson | ............ | H04L 12/2803 725/80 |
| 2013/0300874 A1 * | 11/2013 | Aoshima | ............ | H04N 5/23241 348/158 |
| 2014/0114776 A1 * | 4/2014 | Solanki | .................. | G06Q 30/06 705/15 |
| 2015/0012307 A1 * | 1/2015 | Moss | ..................... | G06Q 10/02 705/5 |
| 2016/0092965 A1 * | 3/2016 | Balar | ................. | G06Q 30/0633 705/15 |
| 2016/0247145 A1 * | 8/2016 | Grimaux | ............. | G06Q 20/352 |

FOREIGN PATENT DOCUMENTS

JP          2007-58800 A   *   3/2007   ............. G06Q 30/00

OTHER PUBLICATIONS

Mozeik, Celeste K., Customer Adoption of Online Restaurant Services—A Multi-Channel Approach, University of Delaware, Spring 2007.*

* cited by examiner

*Primary Examiner* — Nathan Erb
(74) *Attorney, Agent, or Firm* — Schwegman, Lundberg & Woessner

(57) ABSTRACT

Methods, systems, and apparatus, including computer program products, for handling reservations including receiving a reservation request from a patron for a reservation time, reserving space at a venue based on the request, determining whether the patron is present at the venue at the reservation time and, if not, providing a notice to remind the patron of the reservation.

10 Claims, 3 Drawing Sheets

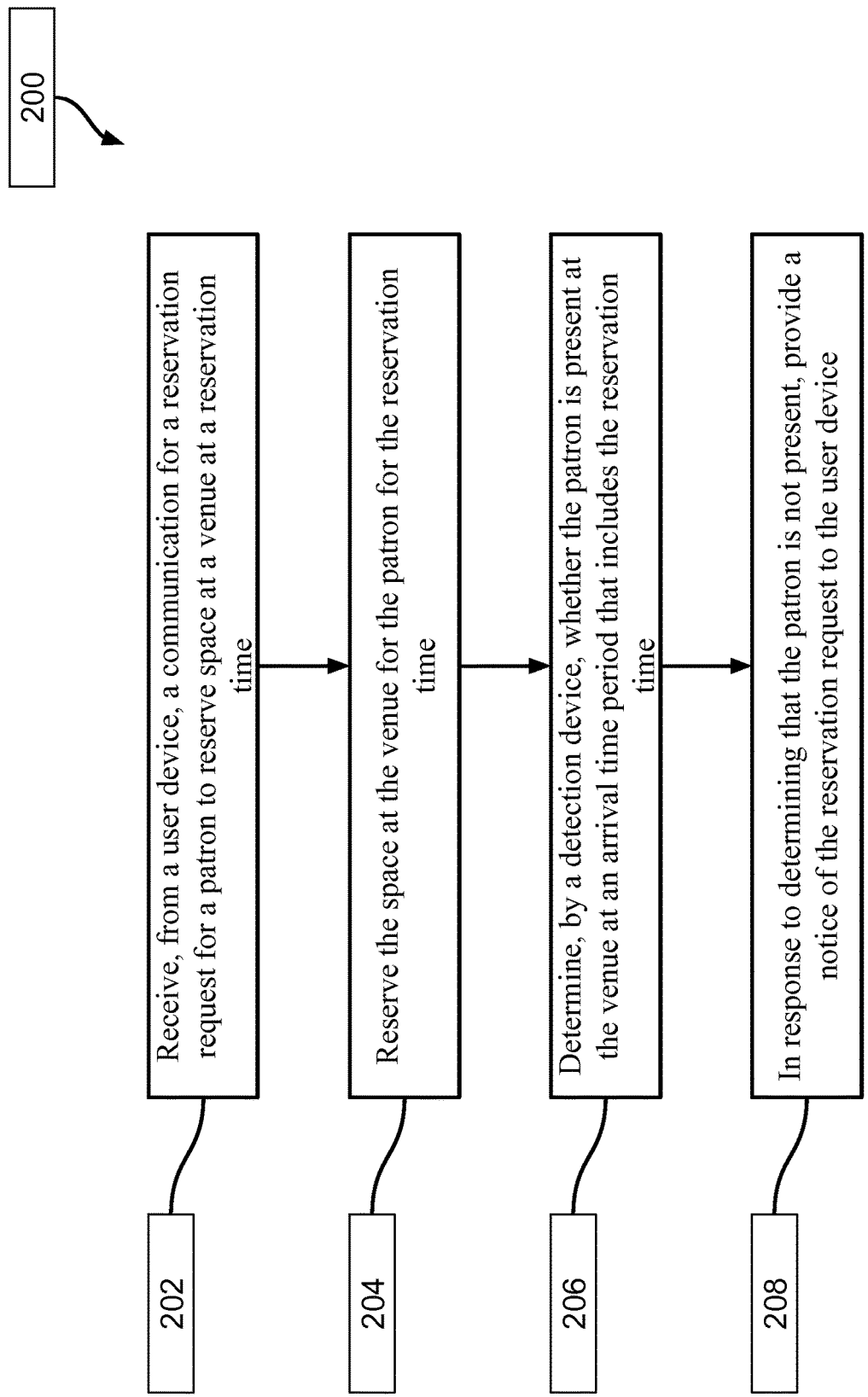

RESERVATION PROCESSING

BACKGROUND

This specification relates to reservation handling such as, for example, restaurant reservation handling.

Many venues, including many restaurants, allow patrons to reserve seating in advance. Reservations allow merchants to plan ahead and manage their resources, e.g., staff, ingredients and available tables, and give patrons some confidence that their wait to be seated will be minimized. However, patrons' plans change. And it is not uncommon that patrons cannot make their reservations and neglect to alert the merchant accordingly so that the merchant can cancel the reservation. Such un-cancelled reservations can disrupt the merchant's business because, for example, seating reserved for the non-showing patron could otherwise be used to serve a patron waiting to be seated. Such disruption, if not remedied, can result in reducing the number of patrons served (resulting in lower revenues for the merchant) and increasing patron dissatisfaction from longer seating wait times, especially with open seating in plain sight to the waiting patrons.

SUMMARY

In general, the subject matter of this specification describes technologies relating to reservations, e.g., restaurant reservations.

In general, one aspect of the subject matter described in this specification can be implemented in methods that include receiving, from a user device, a communication for a reservation request (for example, a restaurant reservation) for a patron to reserve space at a venue at a reservation time. Reserving the space at the venue for the patron for the reservation time. Determining, by a detection device, whether the patron is present at the venue at an arrival time period that includes the reservation time. And in response to determining that the patron is not present, providing a notice of the reservation request to the user device.

In some implementations, determining whether the patron is present includes using a camera to detect whether the patron is present or using a beacon device to detect whether the patron is present based on the presence of the user device.

In some implementations, reserving the space includes reserving a specific table for the patron and determining whether the patron is present includes determining, only during the arrival time period, whether the patron is present at the specific table. The arrival time period can include a time that precedes and/or is subsequent to the reservation time. In some implementations, receiving the communication for the reservation request includes receiving a text or email from the user device and the method can include determining a position of the patron based on a position of the user device to estimate an arrival time of the patron.

A system to perform the technologies and/or methods described herein can include a reservation system configured to accept a request for a restaurant reservation for a patron at a reservation time; determine whether there is table availability to accommodate the restaurant reservation; confirm the reservation request for a specific table in response to determining there is table availability; determine whether the patron is at the table at or before the reservation time; and in response to determining the patron is not at the table at or before the reservation time, send a communication for review by the patron prompting the patron to cancel or extend the reservation request.

In some implementations, the system is configured use a camera and/or a beacon only at the reservation time to determine whether the patron is at the table, and the notice includes a prompt to the patron to cancel or extend the reservation request.

Particular implementations of the subject matter described in this specification can be implemented so as to realize one or more of the following advantages. For example, the efficiency of a system to determine and/or confirm whether a patron is at a table reserved by the patron can be improved. Namely, the reservation time requested by the patron for a restaurant table and the location or identity of the table is available to the system. To confirm whether the patron honors the reservation (e.g., is at the reserved table at the reservation time), the system monitors the area of the reserved table only at the reservation time (and/or just before or after the reservation time). Thus, the system intelligently monitors the reserved table at or around the time of the reservation time, instead of constantly monitoring the table or monitoring the table at times when the patron is not expected. In this way the system's efficiency is enhanced by minimizing (or reducing) the monitor time of the system to reduce (i) the burden on the system and (ii) its energy demands. This can also increase the operational life of the system because system resources are conserved.

Patrons sometimes forget to cancel reservations. This results in, for example, a table being unnecessarily reserved by the restaurant, which can reduce the number of patrons served at the restaurant during the period of the reservation because the table sits idle. The technology described herein reduces the number and/or frequency of these idle tables by determining if the patron is at the table for his/her reservation and, if not, automatically reminds the patron of the reservation (e.g., via the patron's mobile device) and provides the patron with the option to cancel or extend the reservation. Thus, based on the patron's response, the table will either be opened to other patrons or further reserved with the confirmation that the patron is still planning to keep the reservation. This reduces instances of idle tables and enhances the restaurant's revenue.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 2A is a flow diagram of an example method for handling reservations.

Like reference symbols in the various drawings indicate like elements.

DETAILED DESCRIPTION

This specification generally relates to reservation processing and management including handling restaurant reservations. For example, a reservation system, as described in more detail below, receives a reservation request from a patron, e.g., via a communication from the patron's mobile device, to reserve space at a venue such as, for example, a table at a restaurant for a time later in the day. Based on table availability data, the reservation system determines if a suitable table is available at the requested time to accommodate the reservation request. If so available, the reservation system reserves the table and updates the availability data to reflect the new reservation.

At or around the reservation time, the reservation system determines whether the patron is at the venue and/or at the location of the reserved table to confirm the patron is using the reservation. To this end, the system can, for example, use a camera directed to the reserved table (or other venue space) and well-known image processing techniques to visually determine if a patron is at the table. By way of another example, the system can use a beacon device located at the reserved table to sense (e.g., through near-field or other radio frequency communication technologies) whether the requesting patron's user device is at or in close proximity to the table, which indicates whether the patron is also at or near the table. This automated determination, keyed off of the requested reservation time and location of the assigned/reserved table, facilitates the reservation management process as no venue staff involvement is required, which reduces (i) the error associated with such staff involvement and (ii) the burdens on venue staff.

If the patron is not at or near the requested table, the system sends a notice to the patron's user device. The notice includes a message asking the patron to confirm the reservation (and optionally indicate the patron's estimated delay or arrival time) or to cancel the reservation, if the reservation is no longer needed. If the patron confirms the reservation then the reservation is extended to accommodate the patron's delay. If the reservation is no longer needed, the system cancels the reservation, which allows the system to free up the reserved table to serve other patrons. The operation of the reservation system is described in detail below with reference to FIG. 1.

Figure 1:
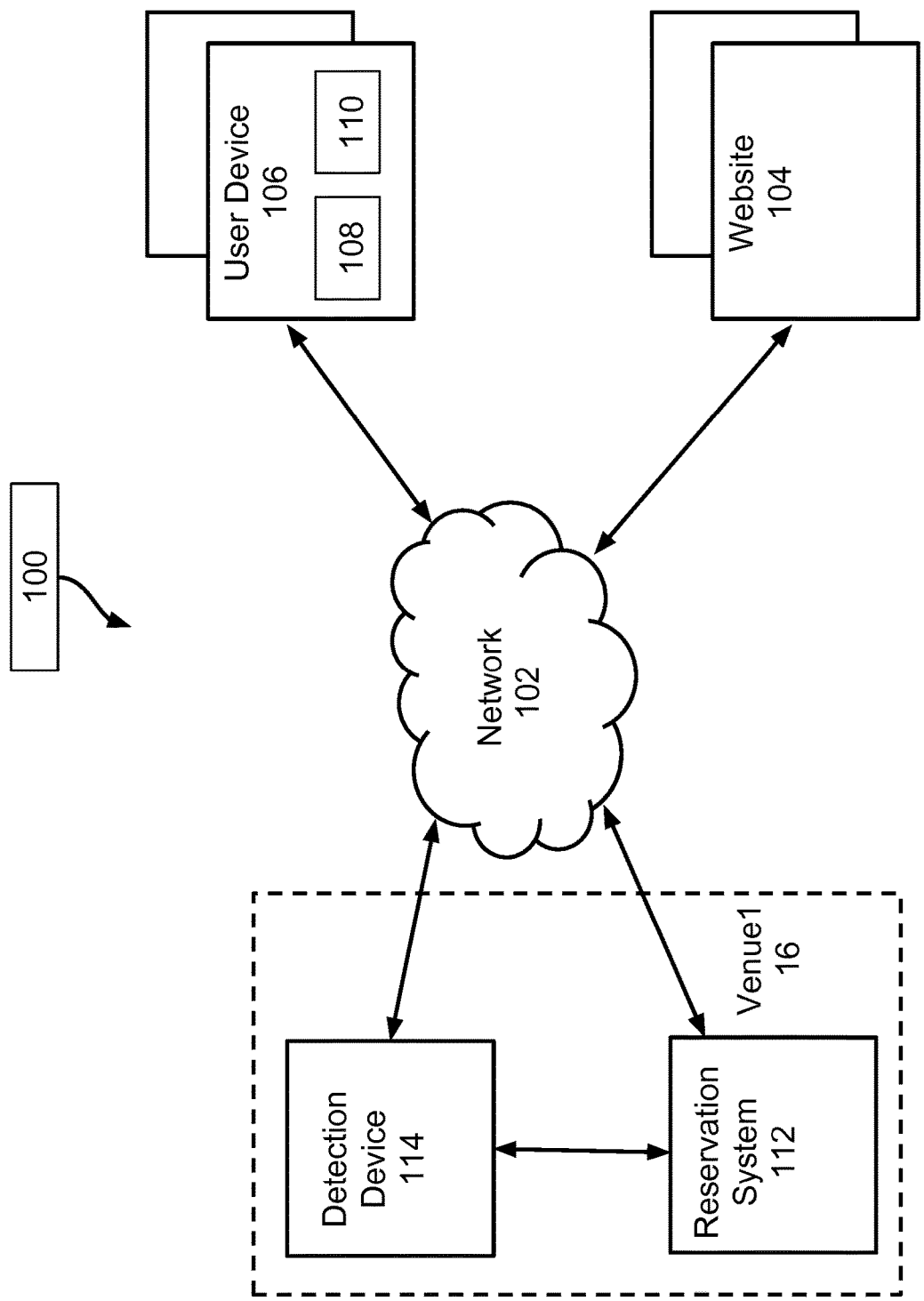
FIG. 1 is a block diagram of an example environment in which reservation handling can occur.

FIG. 1 is a block diagram of an example environment 100 in which reservation handling can occur. The example environment 100 includes a network 102, e.g., a local area network (LAN), wide area network (WAN), the Internet, cellular, POTS (plain old telephone system), or a combination of them, that connects websites 104, user devices 106, a reservation system 112, and a detection device 114. The environment 100 may include many websites 104, user devices 106, reservation systems 112, detection devices 114 and venues 116.

A website 104 is one or more resources associated with a domain name and hosted by one or more servers. An example website 104 is a collection of web pages formatted in hypertext markup language (HTML) that can contain text, images, multimedia content, and programming elements, e.g., scripts.

A resource is any data that can be provided by the website 104 over the network 102 and that is associated with a resource address. Resources include HTML pages, word processing documents, and portable document format (PDF) documents, images, video, and feed sources, to name just a few.

A user device 106 is an electronic device that is under control of a user and is capable of requesting and receiving resources over the network 102, and communicating over the network 102. Example user devices 106 include personal computers (desktop and laptop computers), mobile communication devices such as mobile phones and tablets, and other devices that can send and receive data or otherwise communicate over the network 102. A user device 106 may include a user application 108, e.g., a web browser, to facilitate the sending and receiving of data over the network 102 including accessing and rendering/displaying web pages and other resources. User devices 106 can also include radios 110 (e.g., cellular or Wi-Fi radios or other transceivers) to communicate over the network 102 and/or with other electronic devices.

The reservation system 112 is a data processing apparatus (e.g., computer system) through which reservations are managed. The reservation system 112 can be co-located at a venue 116 or be remote to the venue 116. A venue is a location or site that serves (or provides services or goods to) patrons. Venues include, for example, restaurants, other eateries and other hospitality sites. The reservation system 112, for example, accepts reservation requests, e.g., initiated from user devices 106, accesses table (or space) availability data, determines whether the reservation request can be accommodated, accepts or declines the request based on the availability data, e.g., including communicating the same to the requesting user device 106. The reservation system 112 also, for example, updates the availability data accordingly, and manages the determination of whether the reserved table (or space) is being used as reserved and, if not, communicating with the requesting user device 106 to confirm (and extend) or cancel the reservation.

In some implementations, the reservation system 112 manages the determination of whether the reserved table (or space) is being used as reserved by using a detection device 114. A detection device 114 is a device that monitors a reserved area (e.g., a table) to determine if a patron (e.g., the patron requesting the reserved area) is present at or proximate to the given area such that the reservation is being or likely being used. The detection device 114 can be, for example, a camera pointed at the reserved area or a wireless beacon located at or near the reserved area.

In some implementations, there are numerous detection devices 114 at a venue 116, and the reservation system 112 manages the operation of the detection device 114, as the reservation system 112 has access to the reservation information to determine when and which detection device 114 to use to confirm use given reservations. For example, rather than have all detection devices 114 (or any particular detection device 114) in use at all times, the reservation system 112 intelligently determines when to activate the detection device(s) 114, and which one(s) to activate, based on the time of the reservation and the location of the table reserved for the reservation. In this way, the reservation system 112 can reduce the energy consumption and wear associated with use of the detection device(s) 114. The operation of the reservation system 112 can be described with reference to FIG. 2A, which is a flow diagram of an example method 200 for handling reservations, and FIG. 2B, which is an elevation view of a venue 116.

A reservation request is received through a user device for a patron to reserve space at a venue at a reservation time (202). For example, the reservation system 112 for a restaurant receives a reservation request from a user device 106, at the direction of a patron using the user device 106 (e.g., by receiving a text or email from the patron's mobile device 106). The reservation request, for example, can be submitted to the reservation system 112 by the patron by visiting the restaurant's website 104 and selecting an interactive element (e.g., button) on the website that allows the patron to enter reservation information, for example, the time of the requested reservation and the number of people in the patron's party. A patron can also, or alternatively, for example, submit the request by calling the restaurant and having a restaurant employee enter the reservation request into the reservation system 112.

The space at the venue for the patron is reserved for the reservation time (204). For example, in response to receiving the reservation request, the reservation system 112 accesses table or space availability data storing data describing venue information such as table/seating layout, number of tables/seating spaces, table seating capacity, table/space status (e.g., in use, reserved, and open, and the expected duration of the status), and the number of servers/hosts and table/space assignments for those servers/hosts.

In some implementations, based on the availability data, the reservation system 112 determines whether the venue 116 can accommodate the reservation request, which includes the reservation time. For example, the reservation system 112 determines that the reservation request is for four patrons at 8 PM for a table, and analyzes the availability data to determine whether the venue has an open table at 8 PM that can accommodate four people. If an open table (or space) is available then the reservation system 112 records the reservation in the availability data thereby reserving a specific table for the reservation and, optionally, notifies the requesting patron of the confirmation, e.g., by sending a communication to the patron's user device 106, including a number or location of the reserved table or space. If an open table (or space) is not available then the reservation system 112 can decline the reservation request and notify the patron accordingly.

A detection device determines whether the patron is present at the venue at an arrival time period that includes the reservation time (206). For example, the reservation system 112 controls the detection device 114 (and can monitor its operation and output), and the detection device 114 is used to determine whether the patron that made the reservation (or any patron) is present at the reserved table (or more generally, in the vicinity of the table or at the venue 116) at an arrival time period, which includes the reservation time. In some implementations, the arrival time period also includes a time period before the reservation time, a time period after the reservation time, or both. For example, if the reservation time is 8 PM, the arrival time period can be set to 7:50-8:10 PM. The reservation system 112 can set the arrival time period based on predefined parameters (e.g., +/−10 minutes of the reservation time), or it can be set by a system administrator.

In some implementations, the detection device 114 is used to determine whether the patron is present at the reserved table only during the arrival time period, for example, to conserve energy and reduce system burdens by looking for the patron only when the patron is expected, and not at other times. Continuing with the above example, if the arrival time period is 7:50-8:10 PM, then the reservation system 112 activates, or otherwise instructs or controls, the detection device 114 such that the detection device 114 operates to determine whether the patron is at the reserved table from 7:50 to 8:10 PM. Thus, the detection device 114 may be powered off before 7:50 PM, turned on at 7:50 PM and turned off after 8:10 PM. In some implementations, once the detection device 114 detects the presence of the patron, the reservation system may turn off (or otherwise cause the device 114 to stop actively looking for the patron). For example, if the detection device 114 detects the patron at the reserved table at 8:01 PM the reservation system 112 turns the detection device 114 off at 8:01 PM (e.g., unless the device 114 is needed to detect the presence of a patron at a different reserved table for another reservation).

Figure 2B:
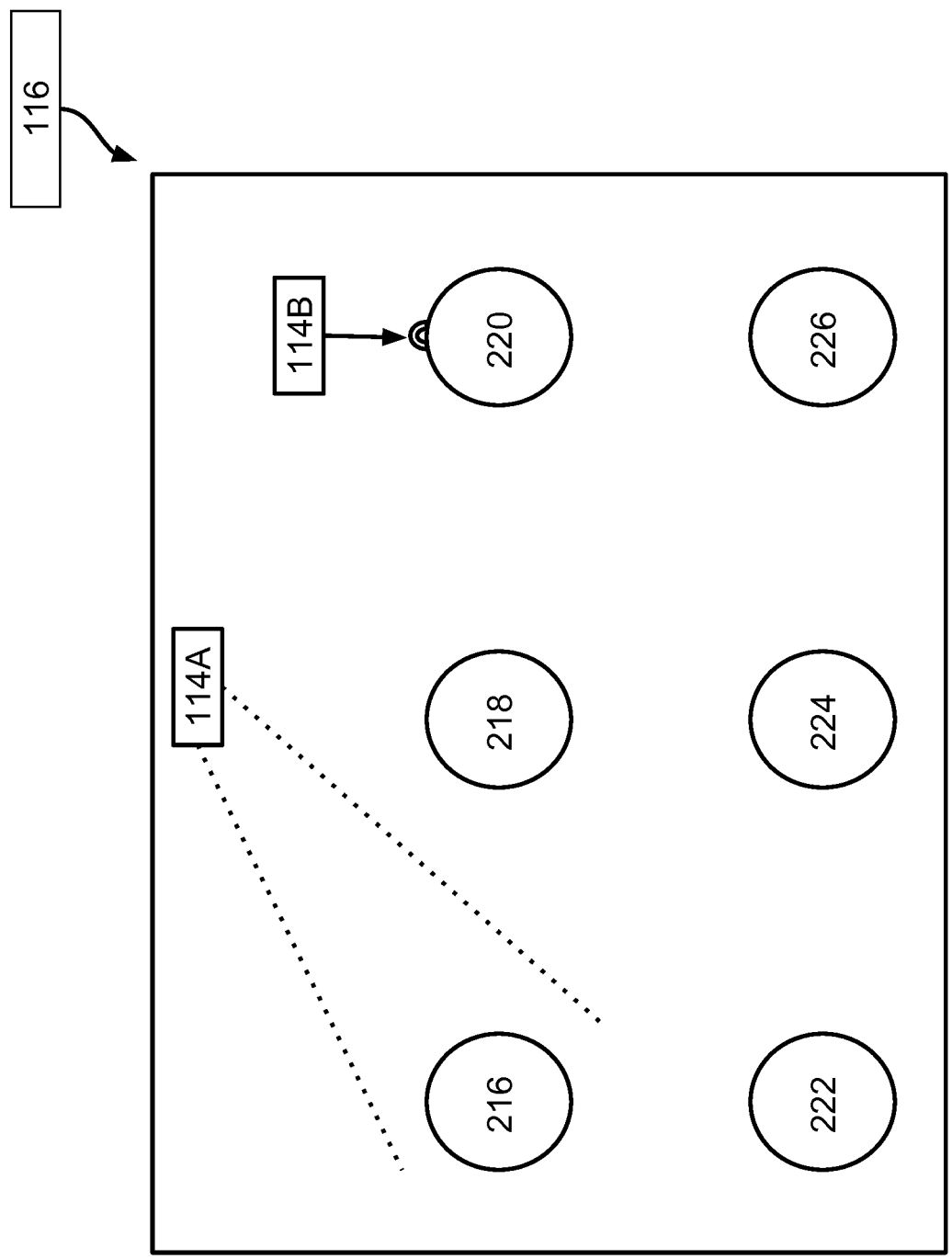
FIG. 2B is an elevation view of a venue.

With reference to FIG. 2B, in some implementations, determining whether the patron is present includes using a camera 114A to detect whether the patron is present, for example, at a reserved table 216. The camera 114A can be positioned on the wall or ceiling of the venue 116 and aimed at the reserved table 216. The camera 114A can also be mounted on an actuator such that it can be aimed at other tables, e.g., tables 218 and 220, as needed to confirm patron presence for reservations at those tables.

Through various image recognition techniques (e.g., linear discriminant, neural networks, clustering and Bayesian approaches) the camera 114A can be used to determine whether a patron is at or proximate the reserved table. In some implementations, the camera (and associated image recognition software, which may run on or be accessibly by the reservation system 112) detects that a person is at or proximate the table, but does not specifically identify the person so it may or may not be the reserving patron. However, if a person is at or near the table at or near the reservation time it's reasonable to conclude that such person is the requesting patron, and use of the reservation is confirmed by the reservation system 112.

In some implementations, the camera 114A (and associated facial recognition software, which may run on or be accessibly by the reservation system 112), can specifically identify the person at the table as the patron, for example, by matching a known image of the patron (e.g., provided by the patron during the reservation process or otherwise available to the reservation system 112) to the current image captured by the camera 114A. If there is such a match, the reservation system 112 confirms use of the reservation.

The detection device 114, in some implementations, can be a beacon device 114B, as shown in FIG. 2B. The beacon device 114B can be positioned at or near the reserved table 220 and detect when, for example, the mobile device 106 of the requesting patron is in close proximity to the table. The beacon device 114B can be a radio frequency device (e.g., using near-field-communication, Wi-Fi, Bluetooth, etc.) that can communicate with or otherwise determine when the patron's mobile device is in its vicinity. In some implementations, an identifier of the patron's mobile device 106, e.g., a telephone number or other identifier, is provided to the reservation system 112 by the patron during the reservation process. The reservation system 112 provides this identifier to the beacon device 114B such that the beacon device 114B can search for the patron's mobile device and determine when it is in close proximity to it and, hence, the reserved table. In some implementations, there may be beacon devices 114B at each table or location in the venue, or some subset thereof.

In response to determining that the patron is not present, a notice of the reservation request is provided to the user device (208). For example, the reservation system 112 monitors the operation and/or output of the detection device 114 and in response to determining that the patron is not present at the reserved table at the reservation time (or, more generally, during the arrival time period), the reservation system 112 sends a notice of the reservation request to the patron's mobile device 106 (or other user device 106).

The notice can be in the form of a text message, email, instant message, or telephone call, to remind the patron of the reservation and/or confirm that the patron still intends to keep the reservation, e.g., by prompting the patron to cancel or extend the reservation request. If the patron, e.g., through the patron's mobile device 106, responds by indicating that the reservation can be cancelled, then the reservation system 112 updates its database(s) accordingly. If the patron responds by indicating that the reservation is to be extended, then the reservation system 112 extends the reservation by a predetermined time (e.g., ten minutes) or, if the patron indicates the length of the requested extension, then by such length.

By way of an example, consider that the reservation time is 8 PM, the arrival time period is 7:50-8:10 PM, it is currently 8 PM and the patron is not at the reserved table (e.g., based on the determination of the detection device 114 and reservation system 112). In some implementations, based on operating rules or programming, if a patron is found not to be at the reserved table by the reservation time, the reservation system 112 causes a text message to be sent to the patron's mobile device 106, as described above. Thus, in this example, if the patron is not at the table by 8:01 PM, the reservation system 112 causes the notice to be sent. In some implementations, the reservation system 112 will send the notice prior to the reservation time (e.g., five minutes before the reservation time), at the reservation time, after the reservation time, or one or some combination thereof. In some implementations, the reservation system 112 will only cause the notice (or notices) to be sent if the patron is determined not to be present immediately prior to sending the respective notice. If the patron is determined to be present, then the reservation system 112 updates its database (s) to reflect the patron's presence and prevents further reminder notices from being sent.

As described above, in response to the notice querying whether the patron plans to keep or cancel the reservation, the patron may respond indicating that he/she intends to keep the reservation but needs to extend the reservation to later in time (e.g., because the patron is delayed by traffic or otherwise running late). In some implementations, the notice includes functionality that allows the patron to indicate how long the reservation is to be extended, e.g., by providing an input box in the notice rendered on the mobile device 106 that the user can fill-in with the requested extension. However, the patron may choose not to respond with the requested extension or the notice does allow for such a response. Thus, in some implementations, upon patron opt-in, the notice may include programming, e.g., a script, that queries the patron's mobile device 106 to determine its geographic location and sends that location information back to the reservation system 112. In turn, the reservation system 112 can then use way finding or navigation software to determine the patron's expected arrival time and extend the reservation accordingly, which permits the venue's management to account for and plan for such delay.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a server, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, software or code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors (e.g., a data processing apparatus) executing one or more computer programs to perform actions by operating on input data and generating output.

Processors suitable for the execution of a computer program include, by way of example, both general and special purpose microprocessors, and any one or more processors of any kind of digital computer (e.g., data processing apparatus). Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) or an LED (light emitting diode) monitor, for displaying information to the user and a keyboard, touchscreen, and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers (e.g., a data processing apparatuses). A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
a server having a processor and a non-transitory computer-readable storage medium;
the non-transitory computer-readable storage medium including executable instructions; and
the processor executing the executable instructions from the non-transitory computer-readable storage medium causing the processor to:
accept a reservation request for a restaurant for a patron for a reservation time;
determine whether there is table availability to accommodate the reservation request;
confirm the reservation request for a specific table in response to determining there is table availability;
power on and activate a detection device situated at the specific table at a configured period of time before an arrival period that is based on the reservation time;
send a table number for the specific table to a user device operated by the patron, wherein the user device is a mobile phone or a tablet and the user device comprises a mobile processor and a mobile-non-transitory computer-readable storage medium having mobile executable instructions that are executed by the mobile processor;
determine whether the patron is at the table at or before the reservation time through interaction with the detection device that provides detection information for the patron at the table, wherein the detection device monitors the specific table only at or before the reservation time and provides the detection information, and wherein the detection device is a camera that captures and supplies images to monitor the table or the detection device is a beacon that detects a presence of the user device proximate to the table based on a wirelessly obtained identifier for the user device and transmits the wirelessly obtained identifier;

in response to determining the patron is not at the table at or before the reservation time, send a communication for review by the patron prompting the patron to cancel or extend the reservation request through interaction with the mobile executable instructions of the user device operated by the patron;

turn off the detection device after the reservation time or when the patron is confirmed at the table unless the patron is associated with an opt-in condition;

query the mobile executable instructions and obtain from the mobile executable instructions a geographical location of the user device of the patron when the patron is associated with the opt-in condition;

process navigation software using a known location of the restaurant and the geographical location of the user device, and determine the patron's expected arrival time; and extend the reservation time based on the patron's expected arrival time when the patron is associated with the opt-in condition and when the patron is not confirmed at the specific table.

2. The system of claim 1, wherein determining whether the patron is at the table comprises using the camera to determine whether the patron is at the table, wherein the camera is the detection device and the detection information is images captured for the patron.

3. The system of claim 2, wherein using the camera to determine whether the patron is at the table comprises using the camera only during the arrival period, which includes the reservation time, to determine whether the patron is at the table.

4. The system of claim 1, wherein determining whether the patron is at the table comprises using the beacon at the table to determine whether the patron is at the table, wherein the detection device is the beacon and the detection information is a user device identifier detected by the beacon for the user device.

5. The system of claim 4, wherein using the beacon at the table to determine whether the patron is at the table comprises using the beacon only during the arrival period, which includes the reservation time, to determine whether the patron is at the table.

6. The system of claim 1, wherein sending the communication for review by the patron comprises sending a text message or email to the mobile executable instructions of the user device operated by the patron.

7. A computer program product comprising a non-transitory computer-readable storage medium storing instructions thereon that, when executed by a data processing apparatus, cause the data processing apparatus to perform operations comprising:

receiving a communication for a reservation request for a patron to reserve a table for a reservation time, wherein receiving further includes receiving the communication as a text or an email sent from a user device that is operated by the patron, wherein the user device is a mobile phone or a tablet and the user device comprises a mobile processor and a mobile-non-transitory computer-readable storage medium having mobile executable instructions that are executed by the mobile processor;

reserving the table for the patron for the reservation time;

sending a table number or table location for the table to the mobile executable instructions of the user device that is being operated by the patron;

powering on a detection device at a configured period of time before the reservation time;

determining whether the patron is present at the table at an arrival time period, wherein the arrival time period includes the reservation time, wherein determining further includes determining whether the patron is present through detection information provided by the detection device, wherein the detection device monitors the table location only at the arrival time period and provides the detection information, wherein determining further includes activating the detection device situated at the table location at the arrival time period, and wherein the detection device is a camera that captures and supplies images to monitor the table or the detection device is a beacon device that detects a presence of the user device proximate to the table based on a wirelessly obtained identifier for the user device and transmits the wirelessly obtained identifier;

in response to determining that the patron is not present, providing a notice of the reservation request to the mobile executable instructions of the user device;

turning off the detection device when the patron is present at the table location or after the arrival time period has expired unless the patron is associated with an opt-in condition;

querying the mobile executable instructions and obtaining from the mobile executable instructions a geographical location of the user device of the patron when the patron is associated with the opt-in condition;

processing navigation software using a known location of a restaurant associated with the table and the geographical location of the user device, and determining the patron's expected arrival time; and extending the reservation time based on the patron's expected arrival time when the patron is associated with the opt-in condition and when the patron is not confirmed at the table.

8. The computer program product of claim 7, wherein the detection device is the camera configured to capture images of the table.

9. The computer program product of claim 7, wherein the detection device is the beacon device configured to identify the presence of the user device based on a user device identifier known to be associated with the user device.

10. The computer program product of claim 7, wherein the notice includes a prompt to the patron to cancel or extend the reservation request.

* * * * *